May 28, 1968   W. SCHRADER ETAL   3,385,415
HALF SPACING ESCAPEMENT MECHANISM FOR TYPEWRITERS
Filed April 20, 1966   2 Sheets-Sheet 1
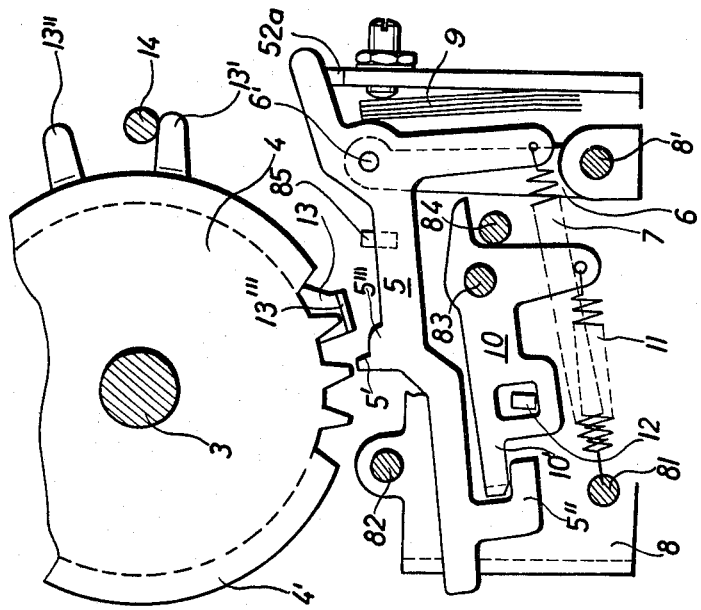
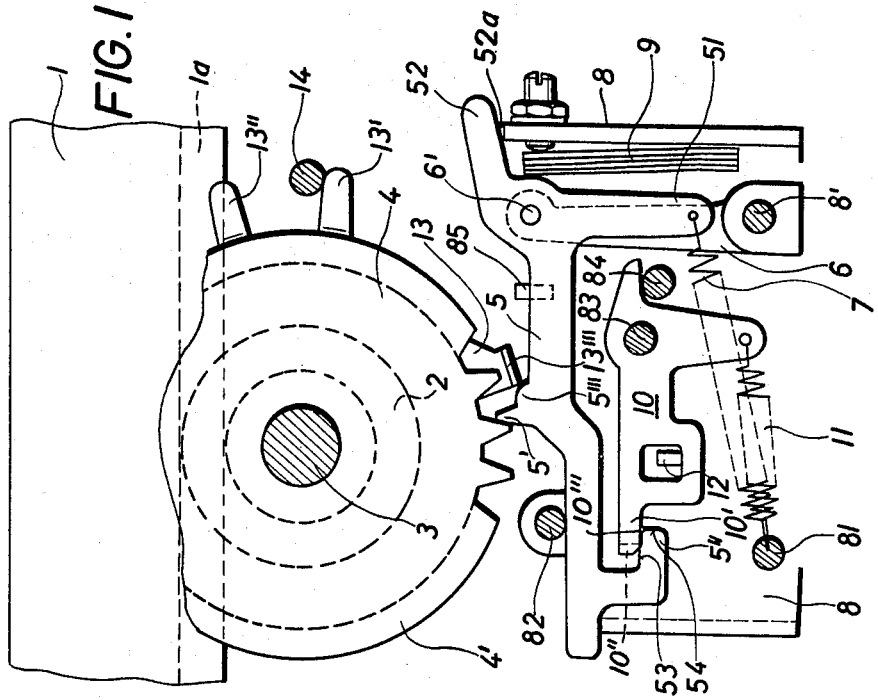
INVENTORS
Wilhelm Schrader
Wolfgang Klingner and
Hans Peter Heins
by Michael S. Striker
Attorney May 28, 1968  W. SCHRADER ETAL  3,385,415
HALF SPACING ESCAPEMENT MECHANISM FOR TYPEWRITERS
Filed April 20, 1966  2 Sheets-Sheet 2
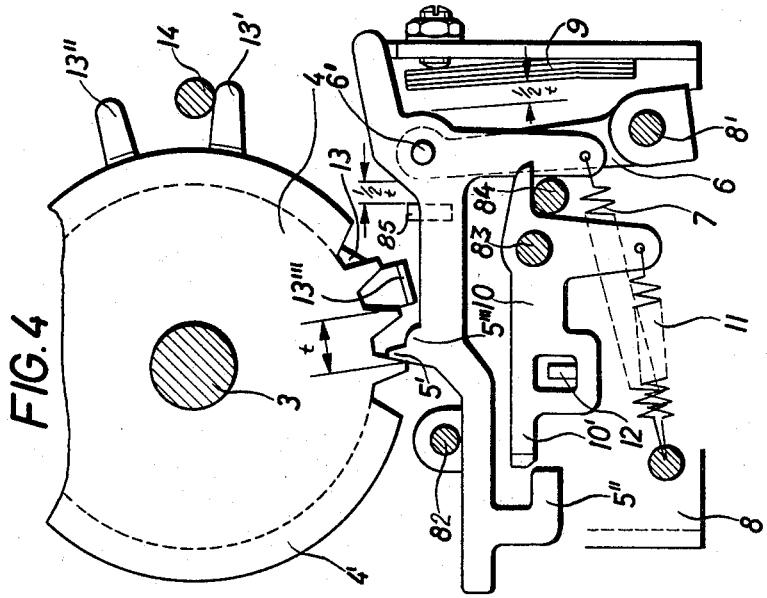
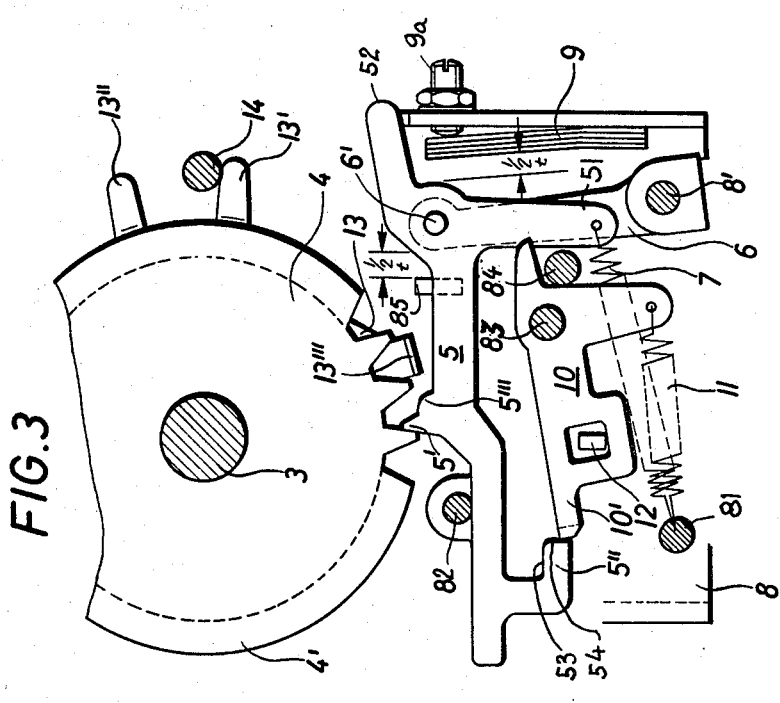
INVENTORS
Wilhelm Schrader,
Wolfgang Klingner and
Hans Peter Heins
  Michael S. Striker
        Attorney United States Patent Office 3,385,415
Patented May 28, 1968

3,385,415
HALF SPACING ESCAPEMENT MECHANISM
FOR TYPEWRITERS
Wilhelm Schrader, Wilhelmshaven, Wolfgang Klingner, Grafschaft, and Hans Peter Heins, Wilhelmshaven, Germany, assignors to Olympia Werke A.G., Wilhelmshaven, Germany
Filed Apr. 20, 1966, Ser. No. 543,865
Claims priority, application Germany, Apr. 23, 1965,
O 10,816
8 Claims. (Cl. 197—84)

ABSTRACT OF THE DISCLOSURE

A control means is operated from the universal bar and from the space bar of a typewriter to effect release of carriage means by an escapement pawl which again engages the carriage means and is moved by the same a full step if the control means is permitted to return to its normal position, and half a step if the control means is held in an actuated position by the depressed space bar.

Background of the invention

The present invention relates to an escapement mechanism for a business machine, and more particularly to an escapement mechanism for controlling the stepwise movement of the paper carriage of a typewriter.

An escapement mechanism for paper carriages is known, in which a rack bar secured to the paper carriage is engaged by a stationarily mounted pinion which is connected with a coaxial stepping wheel cooperating with a pair of pawls mounted on a shifting body which is turnable about an axis crossing the axis of the stepping wheel. One of the pawls is movably mounted on the shifting body, and the other pawl is a blocking pawl, and during the stepping movement, the shifting body is operated to place the movable pawl and the blocking pawl alternately in engagement with the stepping wheel.

This known escapement mechanism, whose shifting body is displaced and actuated under the control of a depressed type lever acting on a universal bar, has substantial masses which have to be moved rapidly, particularly since the shifting body of the pawls must have a strong mechanical construction to sustain with its pawls the inertia of the mass of the heavy moving paper carriage. The springs returning the shifting body to its normal position must be correspondingly strong and heavy.

The energy for displacing the shifting body, including the tensioning of its return spring, is taken from the type lever during the last part of its movement shortly before its impact on the paper carriage. Aside from the mass of the universal bar, the required energy is determined by the mass of the shifting body with the two pawls, which has a double effect since the force of the return spring depends on the mass of the shifting body since the return spring must be sufficient for accelerating the mass of the displaced shifting body in the required short time during the return movement. In any event, the highest possible typing speed is limited noticeably by the mass of the shifting body.

A particular disadvantage of this escapement mechanism is that the phases of the movements of the shifting body on one hand, and of the stepping wheel on the other hand overlap during type lever actuations which follow each other in rapid succession, so that the blocking pawl, instead of falling into the next following recess between two adjacent teeth of the stepping wheel, engages a flank of the tooth of the stepping wheel leading the respective recess, so that so much energy is taken from the type lever of the next following actuated type action, that the impact of the second type lever is much weaker than the impact of the preceding type lever. It has been proposed to improve this condition by mounting the blocking pawl resiliently, but while the above explained disadvantage is reduced, it cannot be eliminated.

From the above explanation it will become apparent that for obtaining a very high typing speed, on one hand the masses accelerated by the type lever and universal bar have to be reduced, and on the other hand it is desirable to eliminate the effect of the blocking pawl on the stepping wheel, which is undesirable at high typing speed. If the effect of the blocking pawl is considered the provision of a blocking means for the stepping wheel in the event of an extremely slow actuation of a key or of the space bar, then only one pawl is required which, similar to the movable pawl of the standard escapement mechanism, releases the stepping wheel upon initiation of a carriage step, but immediately falls into the next following recess between adjacent teeth of the stepping wheel in order to block the carriage a selected time after the release of the respective key or of the space bar.

It is known that the space bar can be used for limiting the step of the paper carriage of a typewriter to only half the normal distance, so that upon actuation of a key, a letter is typed between two adjacent already typed letters.

Such a "correcting space bar" permits the carriage to make a first half step upon actuation of the space bar, and a second half step of the same length upon release of the space bar. During the correction of an error, the space bar is held depressed, and the carriage temporarily arrested after making only half a step.

It is known to provide a single movable pawl directly cooperating with the rack bar on the paper carriage. In this construction, the pawl is movable in the direction of the carriage movement, and also transverse to the same for engaging and releasing the rack bar, and is spring biassed. Upon actuation of the universal bar by a type lever, or upon actuation of the space bar, a control member moves the pawl out of engagement with the rack bar, whereupon the pawl jumps out of engagement with the control member and engages the rack bar. The overlapping of the pawl and the control member determines the minimal spacing between the teeth of the rack bar at which the movable pawl can still reliably cooperate with the rack bar teeth. Since the overlap between the movable pawl and the control member should not exceed a certain minimum distance for reliable operation, this construction cannot be used for rack bars having a small pitch, as is, for example, required for elite type faces, or other very small type faces. Furthermore, it is necessary to harden the rack bar which is subjected to great stress when the heavy carriage is blocked by the pawl. Due to the length and required precision of the pitch and straightness of the rack bar on a paper carriage, this hardening operation is very expensive, and far more difficult to carry out than for a stepping wheel in the first mentioned construction according to the prior art.

Summary of the invention

It is one object of the invention to overcome the disadvantages of escapement mechanisms according to the prior art, and to provide a reliably operating escapement mechanism having a small mass and inertia.

Another object of the invention is to provide an escapement mechanism for the paper carriage of the typewriter permitting very high writing speeds.

Another object of the invention is to provide an escapement mechanism in which the length of the step of a controlled carriage can be selected, as desired.

Another object of the invention is to provide an escapement mechanism for a typewriter carriage in which a single pawl cooperates with a stepping wheel, which is easily hardenable while the accuracy of the pitch of its teeth is maintained.

Another object of the invention is to provide an escapement mechanism permitting even very small steps of a controlled carriage.

Another object of the invention is to provide an escapement mechanism in which a single pawl cooperates with a stepping wheel, and which can be controlled by the space bar to block movement of a paper carriage after half a step, if the space bar is held depressed, whereby corrections by insertion between two adjacent letters is possible.

Another object of the invention is to provide an escapement mechanism in which the escapement pawl, and its control member, as well as the required bearings, guide means, stops, and springs, can be arranged on a single support plate as a unit.

Another object of the invention is to construct such a unit so that it can be built into existent typewriters after removal of a conventional escapement mechanism, without requiring any change of the rack bar, pinion, stepping wheel, and other parts of the typewriter.

With these objects in view, the present invention relates to an escapement mechanism for a business machine which has a paper carriage with a rack bar.

One embodiment of the invention comprises a stepping wheel biassed to turn in one direction and having teeth in the proximity of a pawl which is movable between a releasing position spaced from the teeth of the stepping wheel, and an engaging position engaging one tooth, and also movable in the direction of movement of the teeth between first and second end positions; spring means biassing the pawl to move in the releasing position to the second end position and to the engaging position; stop means blocking the pawl in the first end position so that the engaged wheel is blocked in said one direction; and actuating means including control means movable between a normal and an actuated position.

Since the carriage spring acts through the rack bar on the stepping wheel, the pawl in the engaging position is held by the biassed wheel in the first end position against the action of the spring means.

When the control means is moved to its actuated position, the pawl is moved to the releasing position and permits turning movement of the stepping wheel while the pawl is resiliently urged into the second end position and again to the engaging position, engaging the next following tooth so that the stepping wheel tends to move the pawl to its first end position in which the same is blocked by the stop means, so that the stepping wheel and the carriage are also blocked.

However, if the control means is manually held in the actuated position, for example by depression of the space bar, it is located in the path of movement of a control portion of the pawl in the engaging position, and blocks the pawl, the stepping wheel, and the carriage in an intermediate position before the pawl reaches the first end position.

The overlap between the cooperating control portions of the pawl and control means, is selected so that the carriage is blocked in the intermediate position of the pawl after performing half a normal step. Consequently, a letter can be typed between two adjacent already typed letters, and an omission corrected.

When the control means is manually released, it returns to its normal position under the action of a spring, and is no longer located in the path of movement of the pawl from the second end position to the first end position, so that the carriage step is completed upon release of the space bar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary elevation, partially in section, illustrating an escapement mechanism according to the invention in a normal position of rest in which the carriage is blocked;

FIG. 2 is a fragmentary elevation, partially in section, illustrating the escapement mechanism directly after actuation;

FIG. 3 is a fragmentary elevation, partially in section, illustrating the escapement mechanism in a position in which the control means is held in an actuated position by the depressed space bar, so that the paper carriage is blocked after performing half a step; and FIG. 4 is a fragmentary elevation, partially in section, illustrating the escapement mechanism upon release by the control means and directly preceding the return of the escapement mechanism to the normal position of FIG. 1.

Description of a preferred embodiment

Referring now to the drawings and more particularly to FIG. 1, a conventional paper carriage 1, only partly shown, has a rack bar 1a and is biassed by the standard carriage spring to move toward the left as viewed in the drawing. Rack bar 1a meshes with a pinion 2 mounted on a shaft 3 which carries a stepping wheel 4 consisting of a hardened material so that gear means 1a, 2, 4 move with carriage 1. Pinion 2 and stepping wheel 4 are either directly connected for rotation, or connected by means of a known clutch. Consequently, the carriage spring, not shown, biasses stepping wheel 4 to turn in counterclockwise direction. Stepping wheel 4 has a circular row of peripheral teeth 4', a group of which moves substantially parallel to the rack bar 1a and also in the direction of a pawl 5. Pawl 5 has a projection 5' which cooperates with the adjacent teeth 4'.

Pawl 5 is a part of a three-armed lever mounted on a support 6 which is tiltable about a pivot pin 8' secured to a fixed stationary base plate 8.

Pawl 5 is turnable about pivot pin 6' between a blocking position in which projection 5' engages a tooth 4' of stepping wheel 4, as shown in FIG. 1, and a releasing position in which projections 5' is spaced from the teeth 4', so that stepping wheel 4 is free to turn under the action of the carriage spring as shown in FIG. 2.

A spring 7 is secured to an arm 51 of pawl 5, and also to a frame part 81, and urges pawl 5 to turn in clockwise direction about pivot pin 6'. At the same time, spring 7 urges support 6 to turn about pivot pin 8', and to move pawl 5 from the first end position of FIG. 1 to a left second end position, not shown, in which support 6 abuts the fixed stop 85 and is tilted beyond the position shown in FIG. 4. Consequently, support 6 and pawl 5 with arms 51 and 52, constitute pawl means movable toward and away from the teeth of stepping wheel 4 between a releasing position shown in FIG. 2 and an engaging position shown in FIGS. 1, 3 and 4, and also movable along the respective teeth 4' between a first end position shown in FIG. 1, a second end position on the left of the position shown in FIGS. 3 and 4, and an intermediate position. Arm 52 is guided in a slot 52a of a stationary support plate 8 on which an adjusting screw 9a is mounted.

In the normal position of the escapement mechanism shown in FIG. 1, spring 7 cannot displace the pawl means to the left to the second end position, since the carriage spring which biasses stepping wheel 4 is stronger so that the biassed stepping wheel 4 holds the pawl means in the first end position abutting a buffer spring 9 on plate 8 which forms a stop limiting movement of the pawl means in the first end position, and consequently blocking turning movement of stepping wheel 4 in counterclockwise direction in the position of FIG. 1.

The position of the buffer or stop 9, and thereby the blocked position of stepping wheel 4, can be adjusted by the adjusting screw 9a mounted on base plate 8. Due to the resiliency of the buffer stop 9, the impact of the blocked stepping wheel is dampened.

Pawl 5 has an L-shaped control portion 5" including a guide face 53 and a stop face 54 extending at right angles to each other.

A pivot pin 83 is mounted on the frame 8 and supports a control member 10 for pivotal movement between the normal position shown in FIG. 1, and the tilted actuated position shown in FIG. 2. A spring 11 acts on control member 10 to bias the same in clockwise direction so that control member 10 abuts a stop 84 in its normal position. An actuating means 12 is located in a cutout of control member 10, and is connected to the space bar, not shown, of the typewriter, and to a universal bar controlled by the type actions so that actuating member 12 is lowered from its normal position shown in FIG. 1 to the actuated position shown in FIG. 2 when either a character key or the space bar of the typewriter is depressed.

When actuating member 12 is moved to its actuated operative position shown in FIG. 2, it moves control member 10 to its tilted actuated position whereby pawl 5 is angularly displaced in counterclockwise direction due to the engagement of control portion 10' with control portion 5" of pawl 5. The counterclockwise turning movements of pawl 5 and control member 10 are carried out against the actions of springs 11 and 7.

A stationary stop 82 limits angular movement of pawl 5 in clockwise direction under the action of spring 7 in the first and second end positions shown in FIGS. 1 and 4.

A spring 13 frictionally engages one face of stepping wheel 4 so that friction spring 13 is coupled with stepping wheel 4 for turning movement. Friction spring 13 has two projecting stop portions 13' and 13" cooperating with a fixed stop 14. A further bent projection 13''' of friction spring 13 is located in the region of a projecting portion 5''' provided on pawl 5 adjacent the blocking projection 5'. In the normal position of FIG. 1, projection 13''' is spaced a small distance from projection 5'''. Friction spring 13 has turned with stepping wheel 4 in counterclockwise direction until projection 13' abuts stop 14. During further counterclockwise rotation of stepping wheel 4, friction spring 13 will remain in the same position, sliding on stepping wheel 4 since stop 14 does not permit turning of friction spring 13 with stepping wheel 4 in counterclockwise direction.

*Operation*

In the normal position of the escapement mechanism shown in FIG. 1, the stepping wheel is biassed on the carriage spring to turn in counterclockwise direction, and a tooth 4' abutting blocking projection 5' urges pawl 5 to the illustrated first end position in which pawl 5 abuts the buffer stop 9 so that turning movement of stepping wheel 4 in counterclockwise direction, and consequently carriage movement in writing direction is blocked. Spring 11 turns control member 10 to a position abutting stop 84 in which a guide face 10''' of control portion 10' slidably engages guide face 53 of pawl 5 while pawl 5 abuts stop 82.

When a typewriter key or the space bar is depressed, actuating member 12 is moved downward to the operative actuated position shown in FIG. 2 whereby control member 10 is turned in counterclockwise direction against the action of spring 11, and since control portion 10' acts on control portion 5" of pawl 5, pawl 5 is tilted about pivot pin 6' and moves away from stop 82 to a releasing position in which blocking projection 5' releases the previously engaged tooth of stepping wheel 4 which is thus turned by the carriage spring in counterclockwise direction. Since stepping wheel 4 is separated from pawl 5, it no longer urges pawl 5 into the first end position shown in FIG. 1, and consequently spring 7 moves support 6 about pivot means 8' toward the second end position, not shown, in which support 6 abuts stop 85 while guide face 53 of projection 5" slides on the cooperating guide face 10''' of control portion 10' of control member 10 until guide face 53 is released by control portion 10' so that spring 7 can turn pawl 5 in clockwise direction toward stop 82 whereby blocking projection 5' falls into the recess following the released tooth 4' after moving the pitch distance t, whereupon it is engaged by the next following tooth of the stepping wheel and urged toward the right so that pawl 5 and control portion 5" are also urged toward the right, but if control member 10 is still in its actuated tilted position due to holding of the space bar by the typist, stop face 54 abuts the stop face 10" of portion 10' so that turning movement of stepping wheel 4 is blocked after the stepping wheel has turned an angle corresponding to half the angle between two adjacent teeth 4' and support 6 has moved the distance t/2 away from stop 85. The depth which blocking projection 5' projects into recess between the teeth 4' is determined by stop 82.

When pawl means 5, 6 is moved by spring 7 to the left as viewed in the drawing toward the second end position before engaging a tooth 4', stop face 54 is still spaced from the transverse stop face 10" of portion 10', but when a tooth 4' of stepping wheel 4 is engaged by blocking projection 5', pawl 5 is moved by the stepping wheel to the right as viewed in the drawing until stop face 54 engages the stop face 10" of control portion 10', if control member 10 is held in the tilted actuated position by the space bar.

If control member 10 is immediately permitted to return to its normal position by release of the space bar, for example, or by the universal bar of the typewriter under control of a key and type action, then control portion 5" will move under control portion 10' to its first end position shown in FIG. 1, and stepping wheel 4 will be permitted to move a full step.

Portion 5' and portion 10' can be designed and arranged so that the angular distance which stepping wheel 4 turns between the position of FIG. 1 and the position of FIG. 3, is half the pitch distance t which stepping wheel 4 turns between positions in which two successive teeth 4' engage blocking projection 5' in the position of FIG. 1.

Consequently, as long as the space bar is held depressed to hold control member 10 in the actuated tilted position of FIG. 3, the carriage is blocked after performing half a step, and actuation of a key will cause an imprint to be made between two other normal imprints which are spaced a full carriage step, so that corrections are possible.

If after such a correction or insertion of a character between two other characters, the space bar is released so that actuating member 12 permits control member 10 to return to its normal position shown in FIG. 4, the biased stepping wheel 4 will turn farther in counterclockwise direction and move pawl 5 toward the right the distance t/2 to its first end position while support 6 turns clockwise about pivot pin 8' until pawl 5 abuts buffer stop 9 and further turning of the stepping wheel 4 is blocked. During such movement, control portion 5'' slides under control portion 10' from the position shown in FIG. 4 to the position shown in FIG. 1.

During such stepwise turning movements of the stepping wheel in counterclockwise direction, the carriage 1 performs corresponding full steps or half steps, moving to the left as viewed in FIG. 1 in the writing direction. When the carriage is returned in the opposite return direction, either by an electric motor or by manual operation, stepping wheel 4 turns in clockwise direction.

In order to prevent a rattling noise during carriage return by the successive engagement of blocking projection 5' by teeth 4' which would cause angular displacement of pawl 5 between the position of FIG. 1 and the position of FIG. 2, the friction spring 13 is provided. When stepping wheel 4 starts to turn in clockwise direction during the carriage return, friction spring 13 turns with the stepping wheel, while projection 13' moves away from stop 14. When projection 13''' engages projection 5''' of pawl 5, pawl 5 is pushed down so that blocking projection 5' is retracted from the respective engaged tooth 4' of the stepping wheel. Friction spring 13 is taken along by stepping wheel 4 until its projection 13'' abuts stop 14, and during continued rotation of stepping wheel 4 in clockwise carriage return direction, the friction spring slides on stepping wheel 4 so that projection 13''' remains in the same position, not shown in the drawing, in which projection 13''' holds pawl 5 in a releasing position.

When the carriage is then again operated in writing direction and stepping wheel 4 is turned in counterclockwise direction, friction spring 13 is turned by stepping wheel 4 until projection 13' abuts stop 14, and the angular displacement of the friction spring is sufficient so that pawl 5 is released by projection 13''', and can fall into the opposite recess of the stepping wheel.

It will be understood that each of the elements described above, or two or more together, may also find a useful application in other types of escapement mechanisms differing from the types described above.

While the invention has been illustrated and described as embodied in an escapement mechanism for the paper carriage of a typewriter in which a single pawl cooperates with a stepping wheel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An escapement mechanism for a business machine comprising, in combination, carriage means biased to move in one direction; gear means having teeth and connected with and biased by said carriage means for movement in said one direction; pawl means in the proximity of said teeth and including a first control portion having a first stop face; support means supporting said pawl means for turning movement toward and away from said teeth between a releasing position spaced from said teeth and engaging position engaging one tooth, and also for movement substantially parallel to said one direction between said first and second end positions, said pawl means in said engaging position being urged by said biased gear means to move towards said first end position while said first stop face moves along a predetermined path; stop means blocking said first pawl means in said first end position for blocking movement of said carriage means after one full carriage step; a single control member mounted on said support means for pivotal movement between a normal position and an actuated position and including a second control portion having a second stop face located outside of said path in said normal position of said control member, and in said path in said actuated position of said control member, said second control portion being in sliding contact with said first control portion and overlapping the same when said pawl means is in the first end position so that said control member turning from said normal position to said actuated position turns said pawl means from said engaging position to said releasing position; first spring means biasing said control member to move to said normal position; second spring means biasing said pawl means in said releasing position to move to said second end position and to said engaging position for engaging the next following tooth so that said first and second stop faces are located opposite each other in said path spaced half a step of said carriage means when said control means is in said actuated position; actuating means for connecting said control member with a universal bar and a space bar, so that said control member is held by said actuating means in said actuated position when said space bar is held depressed whereby said carriage means is stopped by engagement of said stop faces after having moved half a carriage step, and so that said first spring means moves said control member back to said normal position and thereby said second stop face out of said path of said first stop face after being shortly actuated by said actuating means under the control of said universal bar so that said carriage means moves a full carriage step until said stop means blocks said pawl means.

2. An escapement mechanism according to claim 1 wherein said support means include a base plate; and wherein said pawl means include a movable support mounted on said base plate for pivotal movement about a first pivot axis, and a pawl mounted on said movable support for angular movement about a second pivot axis, said pawl turning about said second pivot axis between said engaging and releasing positions, and moving between said first and second end positions during turning movement of said support about said first pivot axis.

3. An escapement mechanism according to claim 2 wherein said first spring means is connected with said pawl for urging said pawl to turn about said second pivot axis to said engaging position, and for urging said movable support to turn about said first pivot axis to an angularly displaced position in which said pawl is in said second end position.

4. An escapement mechanism according to claim 1 wherein said gear means comprise a stepping wheel which is at least partly hardened; a pinion connected with said stepping wheel for rotation; and a rack bar secured to said carriage means and being in meshing engagement with said pinion.

5. An escapement mechanism according to claim 1, said support means including a carrier plate and a plurality of pivot means for supporting said pawl means and said control means for pivotal movement, and a plurality of stop means for limiting movement of said pawl means and control means whereby the escapement mechanism constitutes a unit for replacing another escapement mechanism.

6. An escapement mechanism according to claim 1 and including a stop limiting turning movement of said control means in said normal position.

7. An escapement mechanism according to claim 1, said stop means including a buffer spring mounted on said supporting means and being engaged by said pawl means in said first end position for blocking movement of said pawl means, of said gear means, and of said carriage means.

8. An escapement mechanism according to claim 1 wherein said first and second guide faces extend in said engaging position of said pawl means and in said normal position of said control means parallel to the direction of movement of said pawl means between said first and second end positions.

References Cited

UNITED STATES PATENTS

| | | | |
|---|---|---|---|
| 505,521 | 9/1893 | Hamilton | 197—84.3 |
| 1,011,786 | 12/1911 | Hillard | 197—84 |
| 1,054,998 | 3/1913 | Stickney | 197—86 |
| 1,061,639 | 5/1913 | Smith | 197—84 |
| 2,536,619 | 1/1951 | Yaeger | 197—85 |
| 2,648,418 | 8/1953 | Schremp | 197—84 |
| 2,815,109 | 12/1957 | Demmel et al. | 197—84 |
| 2,862,595 | 12/1958 | Toggenburger | 197—84.3 |
| 2,955,695 | 10/1960 | Ling | 197—84.3 |
| 3,232,405 | 2/1966 | Walton | 197—84 |

ROBERT E. PULFREY, *Primary Examiner.*

E. T. WRIGHT, *Examiner.*